(12) United States Patent
Shinohara et al.

(10) Patent No.: US 8,264,655 B2
(45) Date of Patent: Sep. 11, 2012

(54) ELECTRO-OPTIC DEVICE AND ELECTRONIC APPARATUS

(75) Inventors: Takashi Shinohara, Suwa (JP); Goro Hamagishi, Toyonaka (JP)

(73) Assignee: Seiko Epson Corporation, Tokyo (JP)

( * ) Notice: Subject to any disclaimer, the term of this patent is extended or adjusted under 35 U.S.C. 154(b) by 136 days.

(21) Appl. No.: 12/726,055

(22) Filed: Mar. 17, 2010

(65) Prior Publication Data
US 2010/0245997 A1 Sep. 30, 2010

(30) Foreign Application Priority Data

Mar. 27, 2009 (JP) ................. 2009-078888

(51) Int. Cl.
*G02F 1/1345* (2006.01)
(52) U.S. Cl. ......... 349/149; 349/150; 349/151; 349/152
(58) Field of Classification Search ........... 349/149–152
See application file for complete search history.

(56) References Cited

U.S. PATENT DOCUMENTS

| | | | |
|---|---|---|---|
| 6,064,424 A | 5/2000 | van Berkel et al. | |
| 7,589,898 B2 | 9/2009 | Shigemura et al. | |
| 2004/0169920 A1 | 9/2004 | Uehara et al. | |
| 2008/0068720 A1* | 3/2008 | Shigemura et al. | 359/628 |
| 2009/0052027 A1 | 2/2009 | Yamada et al. | |

FOREIGN PATENT DOCUMENTS

| | | |
|---|---|---|
| JP | 09-236777 | 9/1997 |
| JP | 2007-188097 | 7/2007 |
| JP | 2008-070760 | 3/2008 |
| JP | 2009-048116 | 3/2009 |
| JP | 2009-069850 | 4/2009 |

* cited by examiner

*Primary Examiner* — Phu Vu
(74) *Attorney, Agent, or Firm* — Maschoff Gilmore & Israelsen

(57) ABSTRACT

The electro-optic device of the present invention includes an arrangement of an electro-optic panel and a lenticular lens sheet on one side of the electro-optic panel, wherein the lenticular lens sheet includes multiple cylindrical lenses arrayed parallel to one another and an alignment line extending in such a direction as to intersect with the cylindrical lenses at a predetermined angle. The lenticular lens sheet has cylindrical lenses arrayed so that the longitudinal direction of the cylindrical lenses intersects with the pixel array direction of the electro-optic panel at a predetermined angle, and has an alignment line formed in the lenticular lens sheet that is in alignment with the positioning reference portions of the electro-optic panel.

13 Claims, 8 Drawing Sheets

ELECTRO-OPTIC DEVICE AND ELECTRONIC APPARATUS

BACKGROUND

1. Technical Field

The present invention relates to electro-optic devices and electronic apparatuses.

2. Related Art

A display panel with a lenticular lens sheet affixed to the front surface is known as a display device for three-dimensional display (see JP-A-2008-70760). JP-A-2008-70760 discloses a technology for providing a non-periodic flat portion on a lenticular lens sheet so as to accurately align the positions of pixels on the display panel and cylindrical lenses on the lenticular lens sheet.

FIGS. 8A and 8B are diagrams showing a lenticular lens sheet 500 as described in JP-A-2008-70760.

As shown in FIGS. 8A and 8B, the lenticular lens sheet 500 has an array of cylindrical lenses 501, and has non-periodic flat strips 502 occupying part of the lenticular lens sheet 500.

As shown in FIG. 8C, multiple lenticular lens sheets 500 arrayed vertically and horizontally are provided as sheet-like substrate 600. The sheet-like substrate 600, and a panel substrate with multiple LCD panels arrayed vertically and horizontally, after being superimposed and bonded to one another, are cut into individual LCD panels and lenticular lens sheets 500.

The lenticular lens sheet 500 shown in FIGS. 8A to 8C is formed with the non-periodic flat strips 502 parallel to the array of cylindrical lenses 501. Accordingly, when an LCD panel is positioned in the area surrounded by dotted lines shown in FIG. 8C, it is possible to align the lenticular lens sheet 500 with the pixel array of the LCD panel with a high degree of precision.

However, as shown in FIG. 9A, with cylindrical lenses 501 oriented in a diagonal direction in relation to the array direction of the sub-pixels 710 of an LCD panel 700 (see JP-A-9-236777), there are problems such as a decline in manufacturing efficiency and difficulty in aligning components accurately.

More specifically, it is necessary to superimpose the LCD panels 700 diagonally on the sheet-like substrate 600, as shown in FIG. 9B, resulting in a smaller number of LCD panels 700 per panel substrate.

As shown in FIG. 9C, when sheet-like substrate 600 is positioned diagonally on the panel substrate with LCD panels 700 arrayed horizontally and vertically on the panel substrate, the position at which the non-periodic flat strips 502 cross the LCD panels 700 is different for every LCD panel 700. Accordingly, it is difficult to align each LCD panel 700 with the non-periodic flat strips 502.

SUMMARY

An advantage of some aspects of the present invention is that it provides an electro-optic device in which lenticular lens sheets and electro-optic panels are easily aligned, and which can be manufactured with a high degree of efficiency.

In accordance with an embodiment of the invention, an electro-optic device includes an electro-optic panel and a lenticular lens sheet arranged on one side of the electro-optic panel. The lenticular lens sheet includes multiple cylindrical lenses arrayed parallel to one another, and an alignment line formed so as to intersect with the cylindrical lenses at a predetermined angle. The cylindrical lenses are arrayed so that the longitudinal direction of the cylindrical lenses intersects with the pixel array direction of the electro-optic panel at a predetermined angle, and the alignment line of the lenticular lens sheet is in alignment with the positioning reference portions of the electro-optic panel.

In the electro-optic device according to this configuration, an alignment line is formed in the lenticular lens sheet at a predetermined angle in relation to the cylindrical lenses. For this reason, the angle formed by the alignment line and the pixel array direction, when the cylindrical lenses are positioned diagonally to the pixel array direction, is small in comparison to the method wherein a flat strip runs parallel to the direction of the cylindrical lenses. As a result, when manufacturing multiple electro-optic panels as shown in FIG. 9B, the electro-optic panels can be positioned diagonally at a smaller angle, enabling the manufacture of a greater number of electro-optic panels using one sheet of panel substrate (base substrate material). Thus, an advantage of some aspects of the invention is that it provides an electro-optic device of superior manufacturing efficiency.

The "predetermined angle" of this invention is one that is not 90 degrees (not perpendicular.) Thus the predetermined angle α at which the alignment lines and cylindrical lenses intersect is in the range of 0°<α<90° or 90°<α<180°.

Alignment marks are preferably used as positioning reference portions.

With this configuration, it is possible to obtain an electro-optic device wherein alignment lines and alignment marks are used to align lenticular lens sheets and electro-optic panels with a high degree of precision.

Alignment marks acting as positioning references to align the pair of substrates forming an electro-optic panel with one another may be used as positioning reference portions.

With this configuration, it is possible to obtain an electro-optic device wherein lenticular lens sheets and electro-optic panels are aligned with a high degree of precision, without needing alignment marks for the lenticular lens sheets.

Alignment marks acting as positioning references for aligning the circuit board connected to the external connection terminal of the electro-optic panel may be used as positioning reference portions.

With this configuration, it is possible to obtain an electro-optic device wherein lenticular lens sheets and electro-optic panels are aligned with a high degree of precision, without needing alignment marks for the lenticular lens sheets.

Alignment marks for cutting pieces of base substrate material may be used as positioning reference portions, when using a sheet of base substrate material to manufacture multiple electro-optic panels.

With this configuration, it is possible to obtain an electro-optic device wherein lenticular lens sheets and electro-optic panels are aligned with a high degree of precision, without needing alignment marks for the lenticular lens sheets.

Positioning reference portions may have rectilinear ends.

With this configuration, the alignment lines of lenticular lens sheets are aligned with the rectilinear ends of the positioning reference portions, making it easy to improve the alignment precision of the lenticular lens sheet and the electro-optic panel.

The end edge of a pixel group arrayed in a single direction on the electro-optic panel are preferably used as positioning reference portions.

With this configuration, it is possible to obtain an electro-optic device wherein the longitudinal direction of the cylindrical lenses and the pixels can be aligned with an extremely high degree of precision, as the alignment line of the lenticular lens sheet is parallel to the pixel array direction.

The end edges of a light-shielding film of the electro-optic panel may be used as positioning reference portions.

With this configuration, it is possible to obtain an electro-optic device wherein the longitudinal direction of the cylindrical lenses and the pixels can be aligned with an extremely high degree of precision, as the alignment line will be aligned with the light-shielding film that is formed along with the pixel elements.

Wires built into the electro-optic panel may be used as positioning reference portions.

With this configuration, it is possible to obtain an electro-optic device wherein the longitudinal directions of the cylindrical lenses and the pixels can be aligned with an extremely high degree of precision, as the alignment line will be aligned with the wires that are formed along with the pixel elements.

The alignment line is preferably aligned with multiple positioning reference portions.

With this configuration, a single alignment line will be aligned with multiple positioning reference portions, minimizing the effects of thermal expansion of the lenticular lens sheet and other factors, and improving the alignment precision of the lenticular lens sheet and electro-optic panel.

The alignment line is preferably configured to cut across the multiple cylindrical lenses.

With this configuration, the effects of thermal expansion of the lenticular lens sheet and other factors on the alignment line dimensions and the like are minimized, improving the alignment precision of the lenticular lens sheet and electro-optic panel.

The alignment line is preferably a groove or ridge in the surface of the lenticular lens sheet.

In other words, the alignment line is preferably in a form having either concave depth or convex thickness. Alignment lines of this configuration can be formed along with the cylindrical lenses during the process of manufacturing lenticular lens sheets, making it possible to obtain alignment lines that are aligned with the cylindrical lenses with a high degree of precision. For example, the configuration of the alignment lines can be included when fabricating the mold for the lenticular lens sheet. Alternatively, alignment lines may be formed during the process of cutting the cylindrical lenses.

The electronic apparatus according to an aspect of the invention includes the above-referenced electro-optic device.

With this configuration, an electronic apparatus can be provided that is equipped with a display unit that can be manufactured with a high degree of efficiency.

DESCRIPTION OF EXEMPLARY EMBODIMENTS

The following is a description of the electro-optic device of an embodiment of the present invention, accompanied by drawings.

The following description of exemplary embodiments is in no way intended to limit the invention, its applications or uses, and may be freely altered within the range of technical concepts of the invention. Also, the following drawings are intended to illustrate the configuration of embodiments in an easily understandable manner, and include individual structures that may differ in scale, number of units, and the like from the actual structures.

Figure 1:
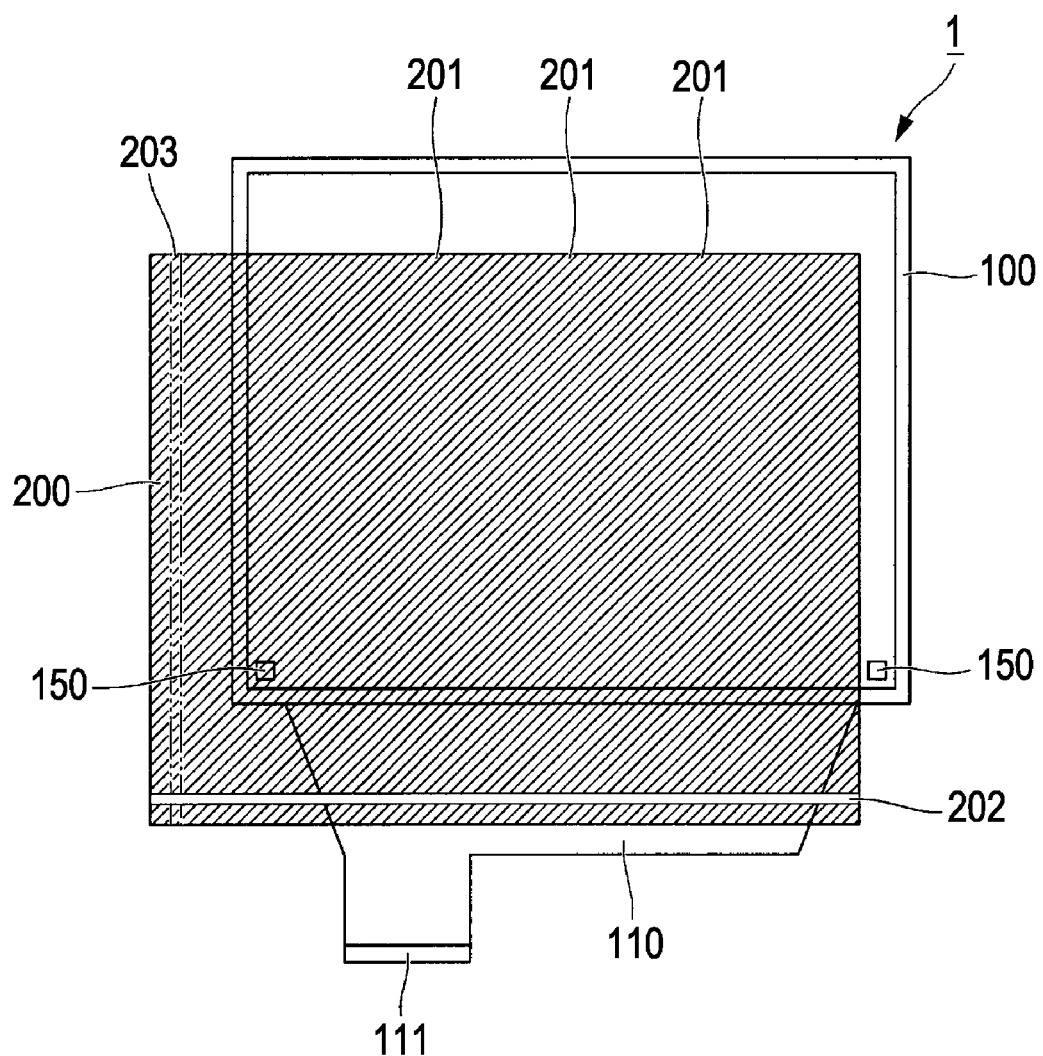
FIG. 1 is a diagram showing an LCD device related to an embodiment of the invention.

FIG. 1 is a diagram showing an LCD device 1 as an electro-optic device being one embodiment of the invention.

The LCD device 1 has an LCD panel (electro-optic panel) 100 and a lenticular lens sheet 200 affixed to the front surface of the LCD panel 100. A flexible substrate 110 with an external connection terminal 111 is connected to one edge of the LCD panel 100. The lenticular lens sheet 200 has multiple cylindrical lenses 201 extending in a diagonal direction and an alignment line 202 extending in a horizontal direction, as shown in the drawing.

FIG. 1 shows the LCD panel 100 and the lenticular lens sheet 200 staggered in order to make the drawing clearly understandable. In actuality, LCD device 1 would have the LCD panel 100 and the lenticular lens sheet 200 bonded to one another, with the alignment marks 150 formed in the LCD panel 100 aligned with the alignment line 202 of the lenticular lens sheet 200.

Figure 2A:
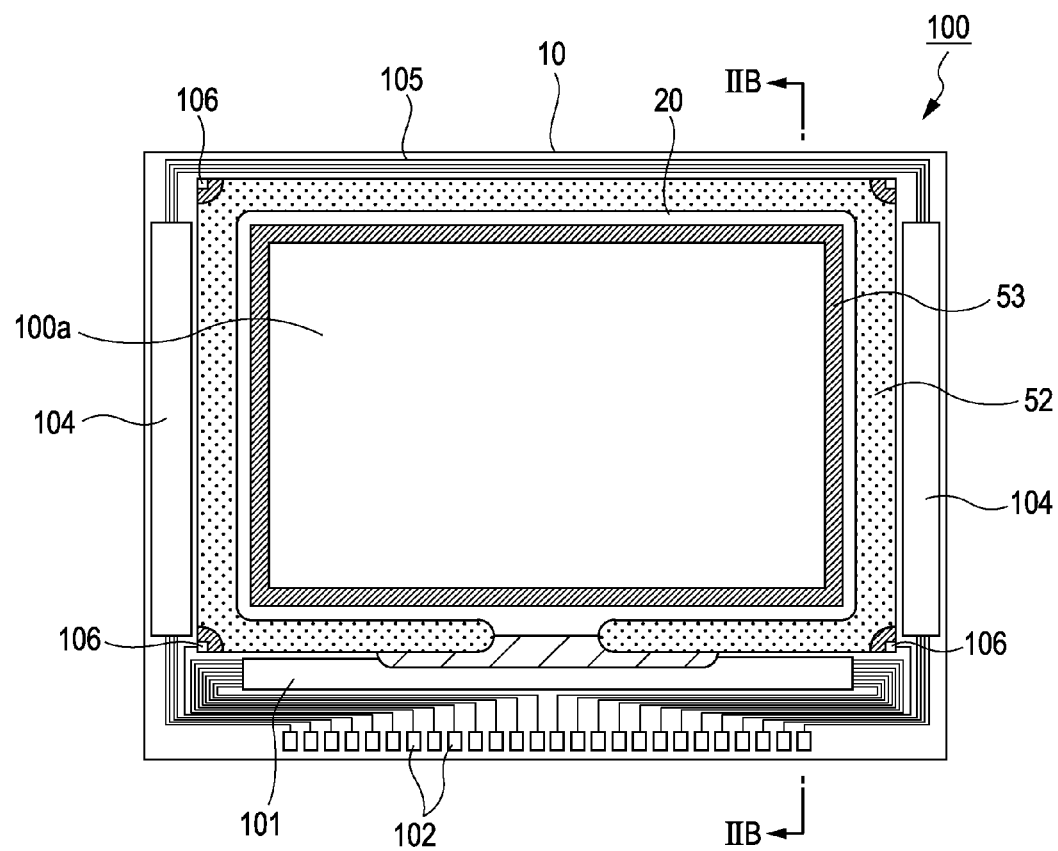
FIGS. 2A and 2B are diagrams showing an LCD panel related to an embodiment of the invention.
Figure 2B:
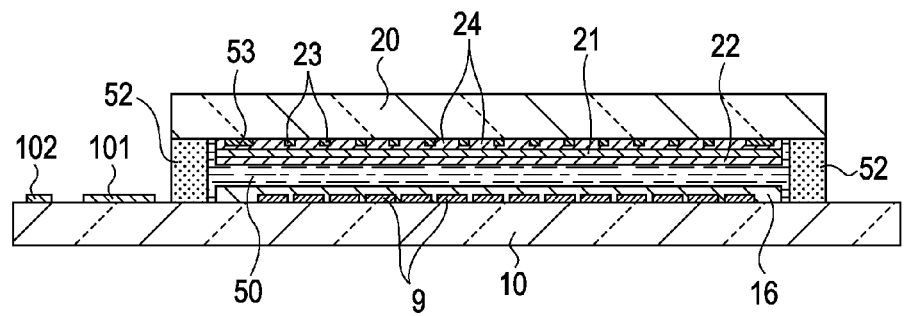

FIG. 2A is a two-dimensional diagram of the LCD panel 100, and FIG. 2B is a cross-section of the LCD panel 100 at the position corresponding to line IIB-IIB.

The LCD panel 100 is an active-matrix transmissive LCD, with individual pixels, each composed of 3 sub-pixels displaying the colors R (red), G (green) and B (blue) respectively. Here the display field forming the smallest unit of the display is called a "sub-pixel region," and a display field formed from 3 sub-pixels is called a "pixel region."

As shown in FIG. 2, the LCD panel 100 has an element substrate (first substrate) 10, a counter substrate (second substrate) 20 positioned opposite to the element substrate 10, and an LCD layer 50 sandwiched between the element substrate 10 and the counter substrate 20. The LCD layer 50 is sealed within a region sectioned off by a sealing member 52, which takes the shape of a frame between the element substrate 10 and the counter substrate 20. A peripheral cutoff member 53 (light-shielding film) is formed along the inner perimeter of the sealing member 52, and in plan view (the view of the element substrate 10 from the side of the counter substrate 20), the rectangular region enclosed by the peripheral cutoff member 53 is an image display region 100a of the LCD panel 100. Also, the LCD panel 100 has a data-line-driving circuit 101 and scanning-line-driving circuits 104 in the exterior field around the sealing member 52, as well as external connection terminals 102 allowing conduction between the data-line-driving circuit 101 and the scanning-line-driving circuits 104, and wires 105 connecting the scanning-line-driving circuits 104.

The cross-sectional structure in FIG. 2B shows the element substrate 10, primarily including quartz, plastic, and the like, and multiple pixel electrodes 9 arrayed on the LCD layer 50 side of the element substrate 10. Orientation film 16 is formed so as to cover the pixel electrodes 9. The data-line-driving circuit 101, the external connection terminals 102, the scanning-line-driving circuits 104 and other elements are also formed on top of the element substrate 10. Although it is not shown in the drawing, each pixel electrode 9 is connected to a pixel switching element in the form of a TFT (thin film transistor), and each TFT is connected to the scanning-line-driving circuits 104 and the data-line-driving circuit 101.

The counter substrate 20 primarily includes glass, quartz, plastic, and the like. On the LCD layer 50 side of the counter substrate 20, the light-shielding film 23 (appearing in the form of a grid in a plan view) and the peripheral cutoff member 53 (formed around the periphery of the light-shielding film 23) are formed. A color filter 24 is formed corresponding to the apertures of the light-shielding film 23, and a common electrode 21 and an orientation film 22 are formed atop the color filter 24.

The LCD panel 100 is not necessarily an active matrix as shown in the drawing. It is possible for the LCD panel 100 to be a passive matrix. Furthermore, it is possible for LCD orientation to take any of a variety of heretofore known forms including but not limited to TN, VAN, STN, ferroelectric, and anti-ferroelectric forms. An embodiment with no color filter is also possible. In addition, it is possible to form a reflective film on the LCD layer 50 side of the element substrate 10 and configure a reflective-type LCD display device, and to form light-transmitting portions such as apertures or slits in the reflective film and configure a semi-transmissive reflective LCD display device.

Figure 3:
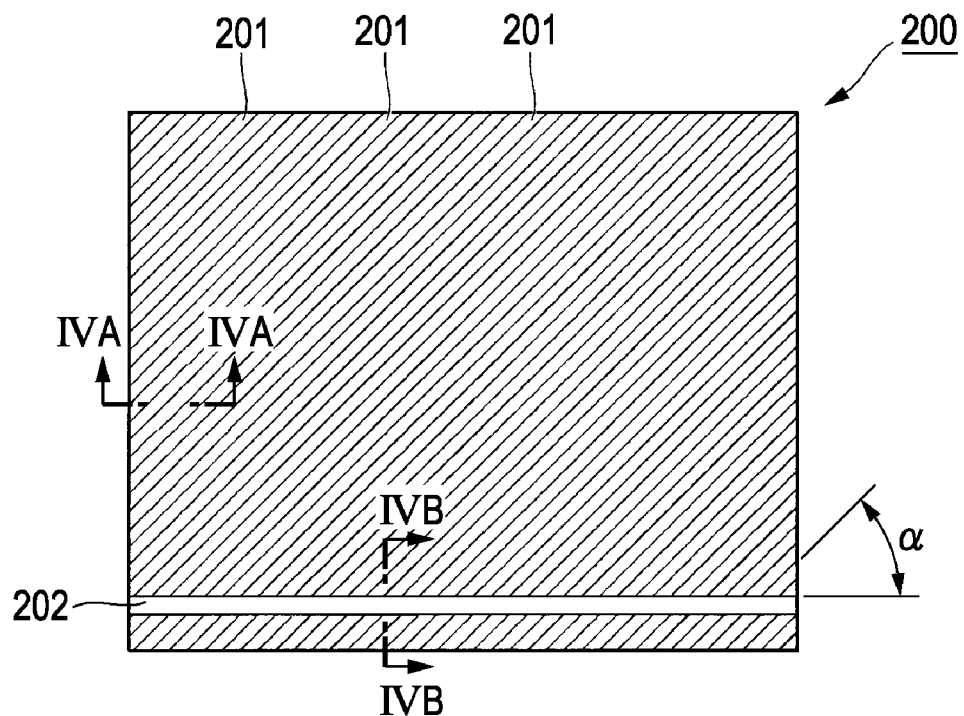
FIG. 3 is a diagram showing a lenticular lens sheet related to an embodiment of the invention.
Figure 4A:
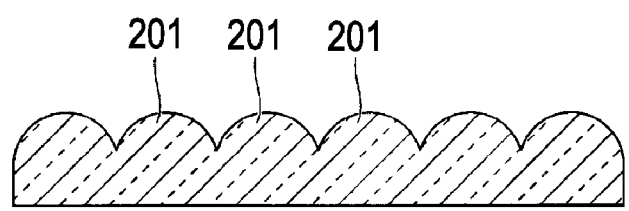
FIGS. 4A and 4B are diagrams showing cross-sections of the lenticular lens sheet of FIG. 3.
Figure 4B:
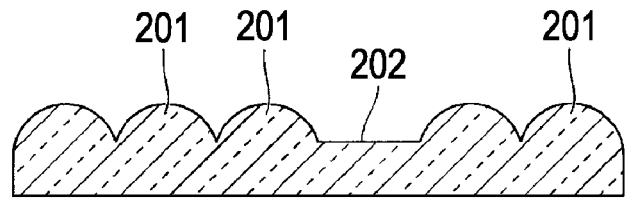

FIG. 3 is a plan view of the lenticular lens sheet 200. FIG. 4A is a cross-sectional view of the lenticular lens sheet 200 seen from along line IVA-IVA in FIG. 3, and FIG. 4B is a cross-sectional view of the lenticular lens sheet 200 seen from along line IVB-IVB in FIG. 3.

The material of the lenticular lens sheet 200 is clear resin, or the like, and is configured with an array of cylindrical lenses 201 in the form of ridges extending parallel to one another, as shown in FIG. 3 and FIG. 4. Also, according to the present embodiment, the alignment line 202 is formed near one edge of the lenticular lens sheet 200 and running parallel to the edge.

An alignment line 203 may be used as an alignment line, extending parallel to a different edge adjacent to the edge along which the alignment line 202 is formed, as shown in FIG. 1. Both the alignment line 202 and the alignment line 203 may also be formed together.

As long as the alignment line 202 and the alignment line 203 are formed so as to intersect with the extending direction of cylindrical lenses 201 at a predetermined angle, it is possible for alignment lines to be formed at angles so as not to be parallel to the edge or edges of the lenticular lens sheet 200.

The alignment line 202 is formed as a flat surface that does not possess a lens function, as shown in FIG. 4B. The surface and cross-sectional configuration of the alignment line 202 is not necessarily the flat surface shown in FIG. 3, but may also take one of any optional configurations, as long as it can be clearly differentiated from the cylindrical lenses 201 and can be used for alignment of the LCD panel 100.

For example, regarding the alignment line 202 shown in FIG. 3, the ridges of the cylindrical lenses 201 may protrude higher than the surface of the alignment line 202, as shown in FIG. 4B, meaning that the alignment line 202 is formed as a groove. On the other hand, the alignment line 202 may also appear as a ridge, protruding above the cylindrical lenses 201. The alignment line 202 could also be a slit-shaped aperture formed in the lenticular lens sheet 200.

The alignment line 202 is preferably a section without a lens function, because if the alignment line 202 possesses a lens function, it makes it difficult to align the LCD panel 100 and the alignment line 202. More specifically, if the alignment line 202 possesses a lens function and the alignment line 202 and the LCD panel 100 are in overlapping positions, viewing the positioning reference portions of the LCD panel 100 through the alignment line 202 causes the planar position of the positioning reference portions to appear out of alignment. This in turn makes it difficult to align the positioning reference portions and the alignment line 202. As a result, the surface of the alignment line 202 is preferably flat as shown in FIG. 4B.

According to the present embodiment, in the lenticular lens sheet 200, the direction in which the alignment line 202 extends (shown as a horizontal direction in the drawing) and the direction in which the cylindrical lenses 201 extend intersects with an angle $\alpha$ therebetween, as shown in FIG. 3. Intersection angle $\alpha$ is determined in accordance with the positions of the reference portions of the LCD panel 100 when they are aligned with alignment line 202. Specifically, when the alignment line 202 is aligned with the positioning reference portions of the LCD panel 100, intersection angle $\alpha$ is set so that the angle formed between the direction in which the cylindrical lenses 201 extend and the pixel array direction of the LCD panel 100 is a predetermined angle. Intersection angle $\alpha$ is not a 90-degree angle, and is in the range $0°<\alpha<90°$ or $90°<\alpha<180°$.

Further, according to the present embodiment, the alignment line 202 is formed so as to cut horizontally across the lenticular lens sheet 200. In other words, the alignment line 202 cuts across the cylindrical lenses 201. This type of structure minimizes the effects of deformation due to thermal expansion and the like of the lenticular lens sheet 200 on the dimensions of the alignment line 202, and increases the alignment precision of the lenticular lens sheet 200 and the LCD panel 100.

Figure 8A:
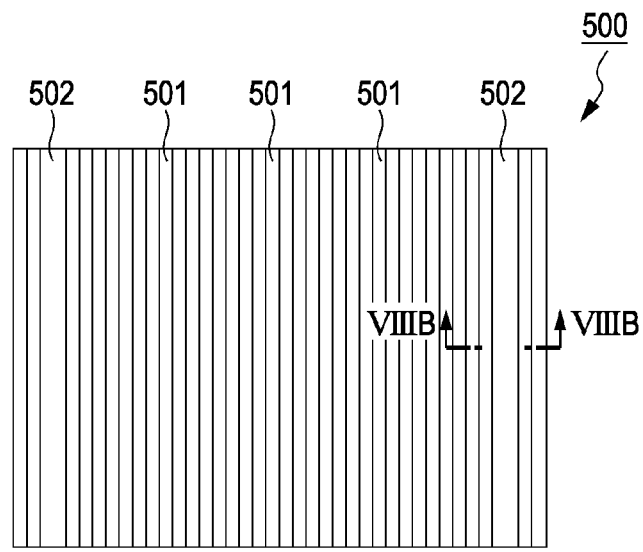
FIGS. 8A to 8C are diagrams showing a lenticular lens sheet employing existing technology.
Figure 8B:
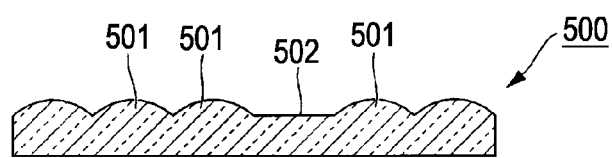
Figure 8C:
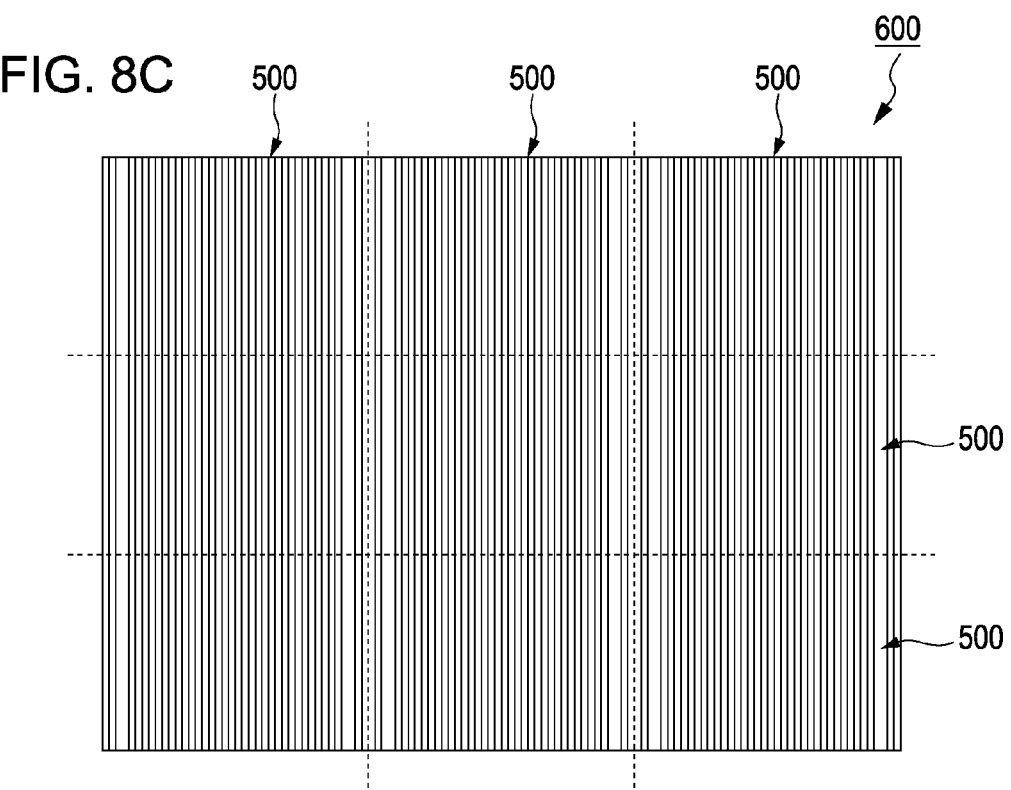
Figure 9A:
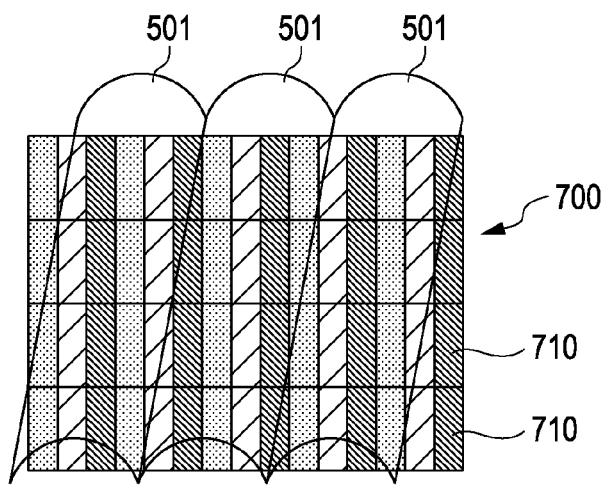
FIGS. 9A to 9C are explanatory diagrams illustrating the process of placing the sheet-like substrate on the panel substrate.
Figure 9B:
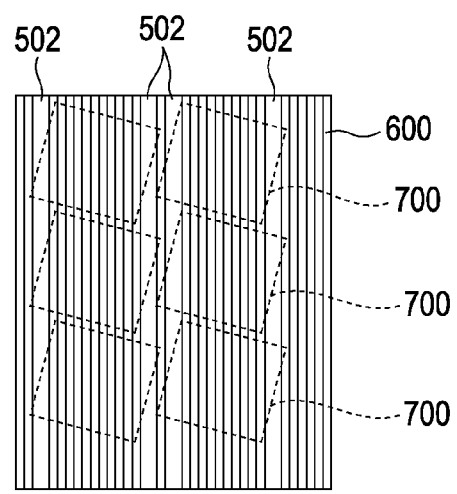
Figure 9C:
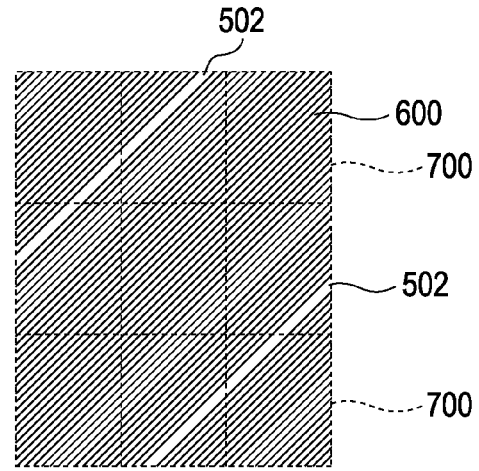

When a lenticular lens sheet 500 of the type used heretofore and shown in FIG. 8 is elongated or contracted in a horizontal direction (the direction the cylindrical lenses 501 are arrayed in), the non-periodic flat strips 502 are moved. This makes it difficult to align the edges of the LCD panels 700, as shown in FIG. 9B.

However, a lenticular lens sheet 200 according to the present embodiment is formed so that the alignment line 202 cuts across the cylindrical lenses 201, so even if the lenticular lens sheet 200 is elongated or contracted in the array direction of the cylindrical lenses 201, the intersection angle $\alpha$ at which the alignment line 202 and the cylindrical lenses 201 intersect remains constant. As a result, the LCD panel 100 can be aligned with precision even if the lenticular lens sheet 200 is elongated or contracted due to thermal expansion and the like.

In lenticular lens sheet 200, alignment line 202 is preferably formed as part of the same process as that used to form the cylindrical lenses 201. For example, if the lenticular lens sheet 200 is produced from resin using a mold, the mold will preferably have the configuration of both the cylindrical lenses 201 and the alignment line 202 on the transfer surface, and both the cylindrical lenses 201 and the alignment line 202 will be molded at the same time. If a sheet of resin is cut to produce the lenticular lens sheet 200, during the processing stage when the cylindrical lenses 201 are cut, it is preferred that the alignment line 202 is formed during the same stage.

In the LCD device 1 according to an aspect of the embodiment, the alignment line 202 of lenticular lens sheet 200 is aligned with the positioning reference portions formed in the LCD panel 100. A wide variety of components formed on top of the LCD panel 100 may act as positioning reference portions for LCD panel 100.

Figure 5:
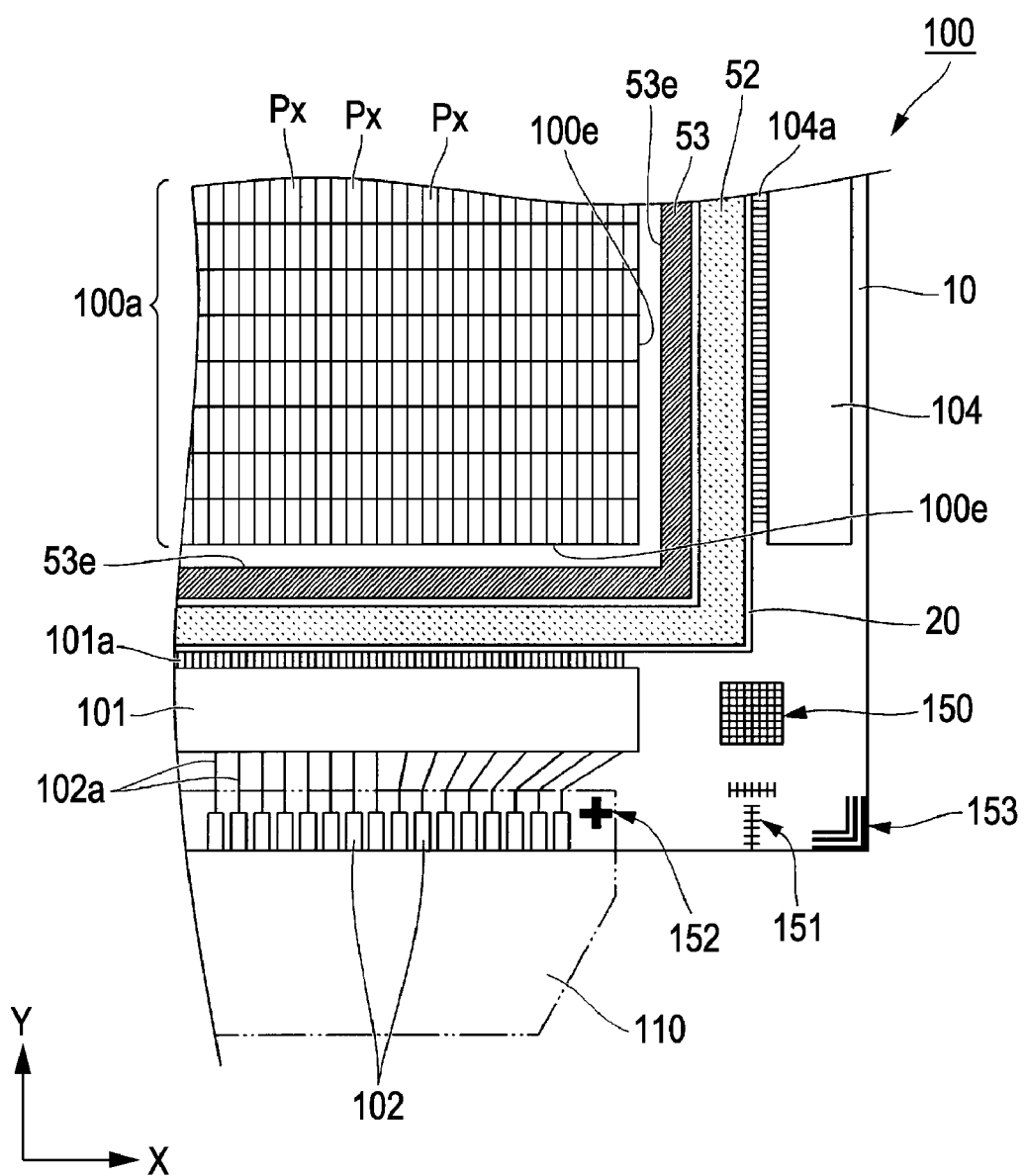
FIG. 5 is a 2D diagram showing an enlargement of part of an LCD panel.

FIG. 5 is an explanatory diagram showing the positioning reference portions on LCD panel 100.

As shown in FIG. 5, alignment marks 150 through 153 are formed in the corners of the LCD panel 100 and in the vicinity of the corners. Also, multiple sub-pixels Px are arrayed in a matrix, as seen in plan view, in image display region 100*a*. The peripheral cutoff member 53 is formed surrounding the image display region 100*a*, and in turn the sealing member 52 is formed surrounding the peripheral cutoff member 53.

The data-line-driving circuit 101 and the scanning-line-driving circuit 104 are arranged on the exterior of the sealing member 52. From the data-line-driving circuit 101, wires 101*a* extend to the image display region 100*a*, and wires 102*a* extend to the external connection terminals 102. From the scanning-line-driving circuit 104, wires 104*a* extend to the image display region 100*a*.

Alignment marks 150 are formed in a grid layout as seen in plan view, and are formed in the element substrate 10 or the counter substrate 20 of the LCD panel 100 as an aid in aligning the LCD panel 100 with the alignment line 202 of the lenticular lens sheet 200. One or more alignment marks 150 may be formed on the LCD panel 100. Multiple marks are preferably formed, going in the same direction as that in which the alignment line 202 extends. By aligning multiple alignment marks 150 with the single alignment line 202, the effects of thermal expansion of the lenticular lens sheet 200 and other factors are minimized, improving the alignment precision of the lenticular lens sheet 200 and LCD panel 100.

Forming specialized alignment marks 150 on the LCD panel 100 so as to aid in performing alignment of the lenticular lens sheet 200 allows precise alignment of the alignment line 202 and the LCD panel 100. Meanwhile, the cylindrical lenses 201 are formed so as to intersect with the alignment line 202 at predetermined intersection angle α. As a result, if the alignment line 202 and the LCD panel 100 are aligned, the cylindrical lenses 201 that extend in a direction diagonal to the array direction of the sub-pixels Px on the image display region 100*a* can be aligned with precision.

Even without forming specialized alignment marks 150, it is possible to employ alignment marks 151 through 153 formed on the LCD panel 100, or any of the various components on the LCD panel 100 as positioning reference portions.

The alignment marks 151 are used for the alignment of the element substrate 10 and the counter substrate 20 when affixing the element substrate 10 and the counter substrate 20 to one another through the sealing member 52. The alignment marks 151 include a scale extending in the array direction (X direction) of the sub-pixels Px, horizontally arrayed on the drawing, and a scale extending in the array direction (Y direction) of the sub-pixels Px, vertically arrayed on the drawing.

Alignment marks 152 are used for the alignment of external connection terminals 102 and the terminals (not shown in the drawing) on the flexible substrate 110, when connecting the element substrate 10 with the flexible substrate 110.

Alignment marks 152 appear in plan view as a cross formation, with one section extending in a straight line in the X direction (sub-pixel Px horizontal array direction) and one section extending in a straight line in the Y direction (sub-pixel Px vertical array direction).

Alignment marks 153 are used as positioning references during the process of dicing (scribe process) where element substrate 10 is manufactured by cutting large pieces of base substrate material into individual units of element substrate 10. The alignment marks 153 appear in plan view as L-shaped marks on the corner of the element substrate 10. One arm of the L shape extends in the X direction (sub-pixel Px horizontal array direction) and one arm extends in the Y direction (sub-pixel Px vertical array direction).

Because the alignment marks 151 through 153 are all formed in predetermined positions in relation to the sub-pixel Px array direction of the image display region 100*a*, they serve as suitable positioning reference portions for aligning with the alignment line 202 of the lenticular lens sheet 200. If any one of or multiple alignment marks 151 through 153 are aligned with the alignment line 202, it is possible to allocate the cylindrical lenses 201 and the sub-pixels Px in predetermined positions with precision.

Multiple alignment marks 151 through 153 are preferably used for alignment with a single alignment line 202. Doing so allows for improvement of the precision of alignment. Multiple marks of one type of alignment marks 151 through 153, or a combination of more than one type of alignment marks 151 through 153, may be used.

According to the embodiment, the alignment line 202 is formed with a straight-line portion, meaning that one or more of the components with straight-line portions formed on the LCD panel 100 may be aligned with the alignment line 202.

For example, on the image display region 100*a*, horizontally and vertically arrayed with sub-pixels Px, an end edge 100*e* may be used as a positioning reference portion. An end edge 53*e* of the peripheral cutoff member 53 may also be used as a positioning reference portion.

Because the end edges 100*e* and 53*e* are formed either parallel or perpendicular to the array direction of the sub-pixels Px, the end edges 100*e* and 53*e* may be aligned with the alignment line 202, enabling alignment of the cylindrical lenses 201 and the sub-pixels Px with precision.

It is further possible, when the sub-pixels Px allocated in the outermost periphery of the image display region 100*a* are dummy sub-pixels (sub-pixels not used for display), to align the end edge of the sub-pixels Px located further inside than the peripheral end edge 100*e* with the alignment line 202. By aligning the end edge of the sub-pixels Px that are actually used for display with the alignment line 202, it is possible to increase the alignment precision of the cylindrical lenses 201 and the sub-pixels Px.

The wires 101*a*, 102*a* and 104*a* extending from the data-line-driving circuit 101 and the scanning-line-driving circuit 104 are examples of components on the LCD panel 100 that can be used as positioning reference portions. Because the wires 101*a*, 102*a* and 104*a* are usually formed along with the scanning lines and the data lines on the image display region 100*a*, they have components running parallel or perpendicular to the array direction of the sub-pixels Px.

By aligning one or more than one of wires 101*a*, 102*a*, and 104*a* with the alignment line 202, it is possible to increase the alignment precision of the cylindrical lenses 201 and the sub-pixels Px.

Figure 6:
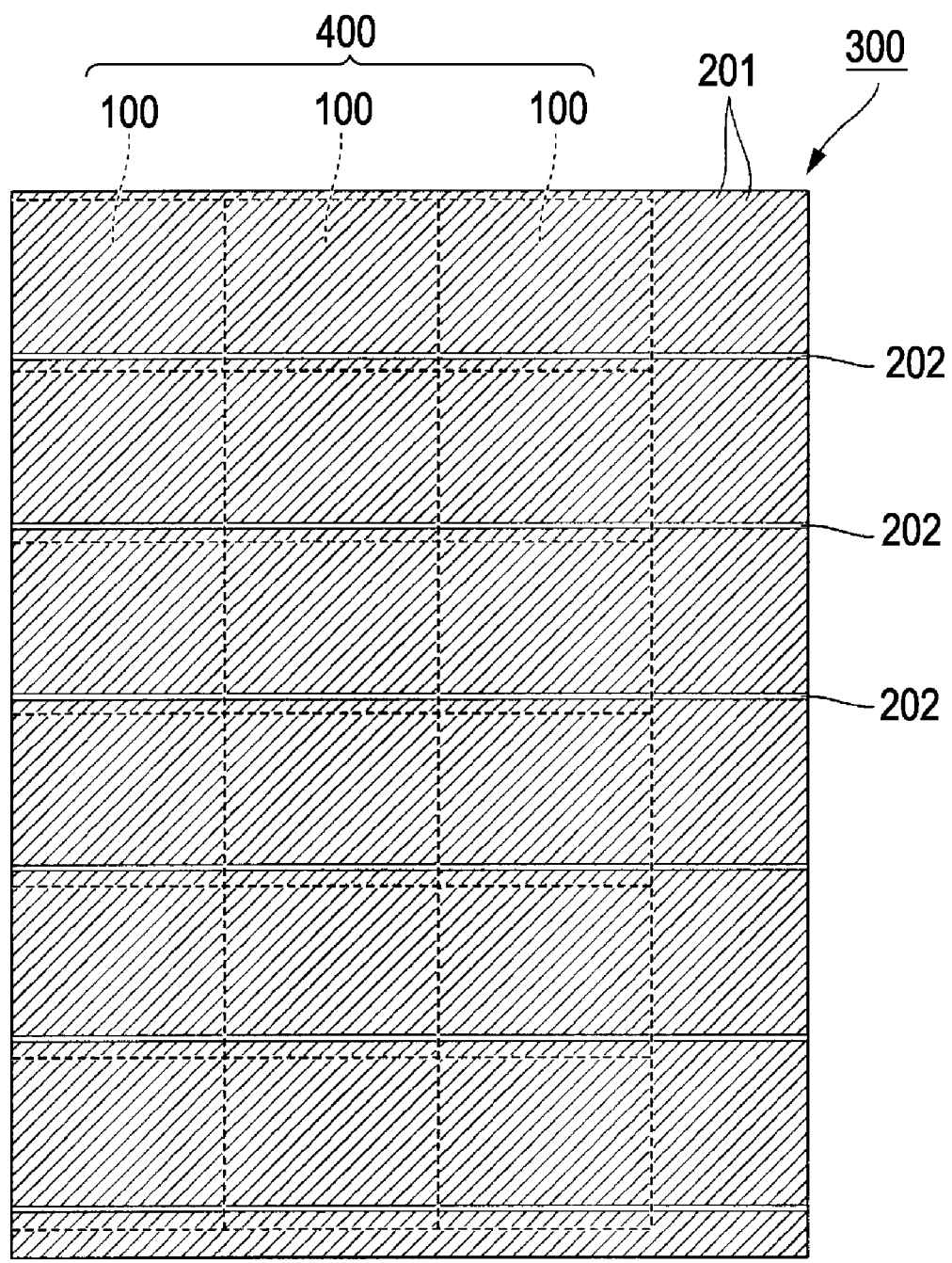
FIG. 6 is a drawing showing the panel substrate and the sheet-like substrate affixed to one another.

The configuration of LCD device 1 according to the embodiment is also effective when affixing the panel substrate 400 with multiple LCD panels 100, and the sheet-like substrate 300 with multiple lenticular lens sheets 200, to one another, as shown in FIG. 6.

As also shown in FIG. 6, the sheet-like substrate 300 is configured with multiple cylindrical lenses 201 extending in a diagonal direction in the drawing, and multiple alignment lines 202 cutting across the cylindrical lenses 201 and extending in a horizontal direction in the drawing. Meanwhile the panel substrate 400 is configured with LCD panels 100 arrayed horizontally and vertically. According to the embodiment, one alignment line 202 is aligned with three LCD panels 100 arrayed horizontally (or in one of the array directions), and the panel substrate 400 and sheet-like substrate 300 affixed to one another.

In the sheet-like substrate 300 according to an aspect of the embodiment, alignment lines 202 are formed to intersect with cylindrical lenses 201 at a predetermined angle (α). As shown in FIG. 6, the alignment lines 202 go in the same direction as the array direction of the LCD panels 100, and the alignment lines 202 can be aligned with the positioning reference portions on the LCD panels 100. An advantage of some aspects of the embodiment is that the LCD device 1 can be manufactured efficiently using the panel substrate 400 with LCD panels 100 arrayed in a matrix formation.

FIG. 6 shows a configuration in which the alignment lines 202 are formed parallel to the array direction of horizontal LCD panel 100 (the direction shown as a horizontal direction in the drawing). However, the alignment lines 202 need not necessarily run parallel to the array direction of the LCD panels 100. As long as the cylindrical lenses 201 extend in a direction so as to intersect with the alignment lines 202 at a predetermined angle, at least the angle of intersection of the LCD panel 100 peripheral edges (outer edges) and the alignment lines 202 will be smaller than the angle formed by the LCD panel 700 peripheral edges and the non-periodic flat strip 502 as shown in FIG. 9B. As a result, in comparison with the setup illustrated in FIG. 9B, a greater number of panels can be manufactured using a sheet of panel substrate of the same size.

If the alignment lines 202 and the array direction of the LCD panels 100 are tilted only a few degrees in relation to one another, the positioning of the alignment marks on the LCD panels 100 can be adjusted so as to resolve the issue easily.

The aspect of the embodiment described herein uses LCD panels as an example of an electro-optic panel, but the present invention is in no way limited to LCD panel applications. Other types of electro-optic panels may also be used, including organic EL panels, electrophoresis display panels, plasma display panels, and field emission display (FED) panels. The operational advantages described above may be obtained no matter what type of electro-optic panel is used.

Electronic Apparatus

The aspect of the present embodiment described above relates to an electronic apparatus equipped with an LCD device (display device).

Figure 7A:
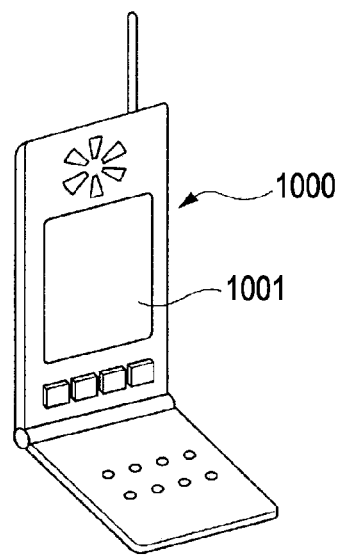
FIGS. 7A to 7D are diagrams showing examples of electronic apparatuses.
Figure 7B:
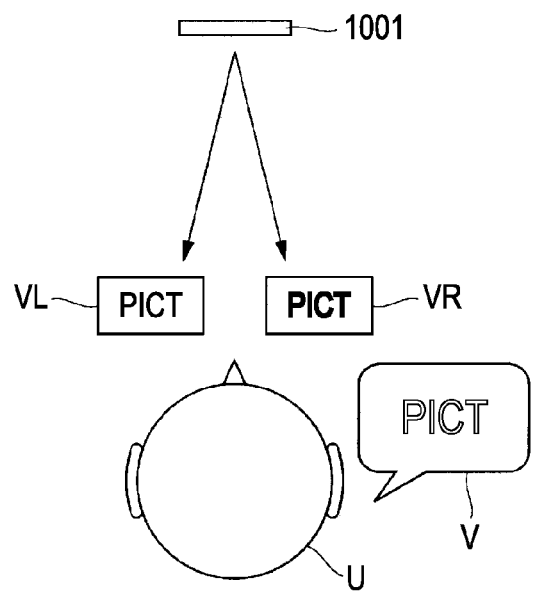

FIG. 7A is a perspective view of an example of a mobile phone. In FIG. 7A, a mobile phone includes a body 1000 of the mobile phone itself, and an LCD display part 1001 employing an LCD device according to an aspect of the embodiment. FIG. 7B is a diagram illustrating the mechanism for displaying a three-dimensional image V using the mobile phone of the present example. As shown in FIG. 7B, output from the LCD display part 1001 goes in the two directions VL and VR. User U sees the two images simultaneously, image VL in the left-side field of vision and image VR in the right-side field of vision. When viewing the two images simultaneously, as a result of binocular disparity, user U sees a three-dimensional image V having depth of field.

Figure 7C:
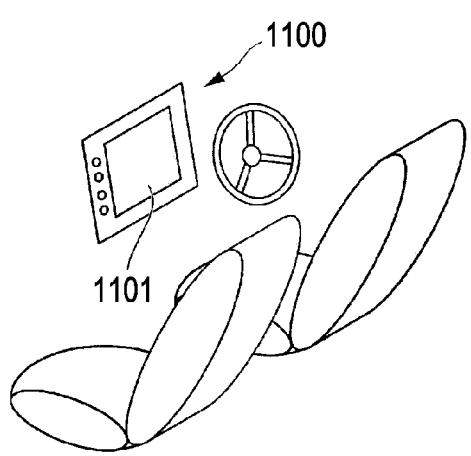
Figure 7D:
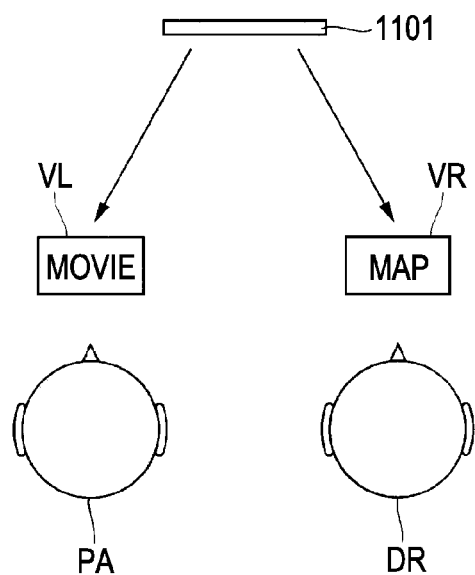

FIG. 7C is a perspective view of an example of a car navigation system. In FIG. 7C, the car navigation system includes a body 1100 of the car navigation system itself, and an LCD display part 1101 employing an LCD device according to an aspect of the embodiment. FIG. 7D is a diagram explaining the mechanism for displaying two different images simultaneously, each one viewed separately by the driver DR and passenger PA, using the car navigation system of the present example. As shown in FIG. 7D, output from the LCD display part 1101 goes in the two directions VL and VR. Driver DR sees only image VR, and passenger PA sees only image VL. Thus driver DR may view a map or other information while at the same time passenger PA views a movie or some other type of image.

The electronic apparatuses shown as examples in FIG. 7 employ as display devices the LCD device 1 (electro-optic device) of an aspect of the present invention. The electronic apparatuses are equipped with a three-dimensional display function of superior image quality.

The entire disclosure of Japanese Patent Application No. 2009-078888, filed Mar. 27, 2009 is expressly incorporated by reference herein.

What is claimed is:

1. An electro-optic device comprising:
   an electro-optic panel having a plurality of pixels arrayed and a positioning reference portions; and
   a lenticular lens sheet arranged on one side of the electro-optic panel, the lenticular lens sheet having:
      multiple cylindrical lenses arrayed parallel to one another, the cylindrical lenses are arrayed so that the longitudinal direction of the cylindrical lenses intersects with the pixel array direction of the electro-optic panel at a predetermined angle α, where $0°<α<90°$ or $90°<α<180°$, and
   an alignment line extending in such a direction as to intersect with the cylindrical lenses at a predetermined angle, the alignment line is in alignment with the positioning reference portions of the electro-optic panel.

2. The electro-optic device of claim 1, wherein the positioning reference portions may act as alignment marks.

3. The electro-optic device of claim 2, wherein the positioning reference portions may act as alignment marks for aligning the pair of substrates making up the electro-optic panel with one another.

4. The electro-optic device of claim 2, wherein the positioning reference portions may further act as alignment marks for aligning the circuit board connected to the external connection terminal of the electro-optic panel.

5. The electro-optic device of claim 2, wherein the positioning reference portions may further act as alignment marks for cutting pieces of base substrate material, when using one sheet of base substrate material to manufacture multiple electro-optic panels.

6. The electro-optic device of claim 1, wherein the positioning reference portions may have rectilinear ends.

7. The electro-optic device of claim 6, wherein the positioning reference portions may be located at the end edge of the pixel group arrayed in a single direction on the electro-optic panel.

8. The electro-optic device of claim 6, wherein the positioning reference portions may be located at the end edge of the light-shielding film of the electro-optic panel.

9. The electro-optic device of claim 6, wherein the positioning reference portions may be wires built into the electro-optic panel.

10. The electro-optic device according to claim 1, wherein the alignment line may be aligned with the positioning reference portions.

11. The electro-optic device according to claim 1, wherein the alignment line may be configured to cut across the multiple cylindrical lenses.

12. The electro-optic device according to claim 1, wherein the alignment line may be a groove or ridge in the surface of the lenticular lens sheet.

13. An electronic apparatus including the electro-optic device according to claim 1.

* * * * *